(12) United States Patent
Stehmeiner et al.

(10) Patent No.: US 9,457,553 B2
(45) Date of Patent: Oct. 4, 2016

(54) SYSTEM AND METHOD FOR REPAIRING A STRUCTURAL COMPONENT

(71) Applicant: AIRBUS OPERATIONS GMBH, Hamburg (DE)

(72) Inventors: Heiner Stehmeiner, Hamburg (DE); Clemens Bockenheimer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 13/721,935

(22) Filed: Dec. 20, 2012

(65) Prior Publication Data

US 2013/0160923 A1   Jun. 27, 2013

Related U.S. Application Data

(60) Provisional application No. 61/579,254, filed on Dec. 22, 2011.

(30) Foreign Application Priority Data

Dec. 22, 2011   (DE) .................. 10 2011 122 059

(51) Int. Cl.
| | |
|---|---|
| *B32B 41/00* | (2006.01) |
| *B29C 73/10* | (2006.01) |
| *B64F 5/00* | (2006.01) |
| *B29C 73/24* | (2006.01) |

(52) U.S. Cl.
CPC ............... *B32B 41/00* (2013.01); *B29C 73/10* (2013.01); *B29C 73/24* (2013.01); *B64F 5/0081* (2013.01)

(58) Field of Classification Search
CPC ........... G01M 5/0033; G01M 5/0016; G01M 11/088; G01M 5/0083; G01N 29/2475; G01B 5/30; H01L 41/1132; G01L 1/205; G01L 1/146
USPC ............ 156/64, 350, 351, 378, 379; 73/767, 73/769, 772, 799, 862.67, 862.68
See application file for complete search history.

(56) References Cited

U.S. PATENT DOCUMENTS

| | | | |
|---|---|---|---|
| 5,023,987 A | 6/1991 | Wuepper | |
| 5,969,260 A | 10/1999 | Belk | |
| 6,031,212 A * | 2/2000 | Westerman et al. | 219/535 |
| 6,076,405 A * | 6/2000 | Schoess | 73/587 |
| 6,370,964 B1 * | 4/2002 | Chang et al. | 73/862.046 |
| 7,197,931 B2 * | 4/2007 | Kim | 73/587 |
| 2011/0132523 A1* | 6/2011 | Evens | B29C 73/10 156/94 |

FOREIGN PATENT DOCUMENTS

| | | |
|---|---|---|
| DE | 282 881 | 9/1990 |
| DE | 10 2006 057 255 | 6/2008 |

OTHER PUBLICATIONS

Wishaw M, Barton, "Comparative Vacuum Monitoring: a New Method of In-Site Real Time Crack Detection and Monitoring", https://web.archive.org/web/20020816125056/http://www.ndt.net/article/apcndt01/papers/1129/1129.htm, Aug. 8, 2002.*

* cited by examiner

*Primary Examiner* — Michael N Orlando
*Assistant Examiner* — Joshel Rivera

(57) ABSTRACT

A system for repairing a structural component, in particular an aircraft structural component, includes a repair patch which is connected to the structural component in such a manner that it covers an opening in the structural component resulting from removing a damaged region of the structural component. A sensor is fastened to the repair patch in a region of the repair patch covering the opening in the structural component and is designed to detect strains and/or stresses occurring in the repair patch. An evaluating device is adapted to evaluate the strain values and/or stress values detected by the sensor and, in dependence on the result of this evaluation, output a signal which is characteristic of the quality state of the connection between the structural component and the repair patch.

23 Claims, 4 Drawing Sheets

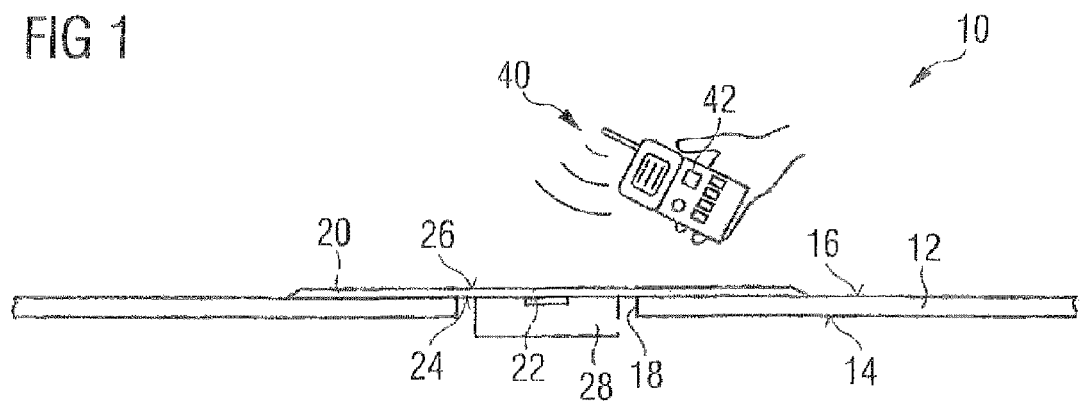
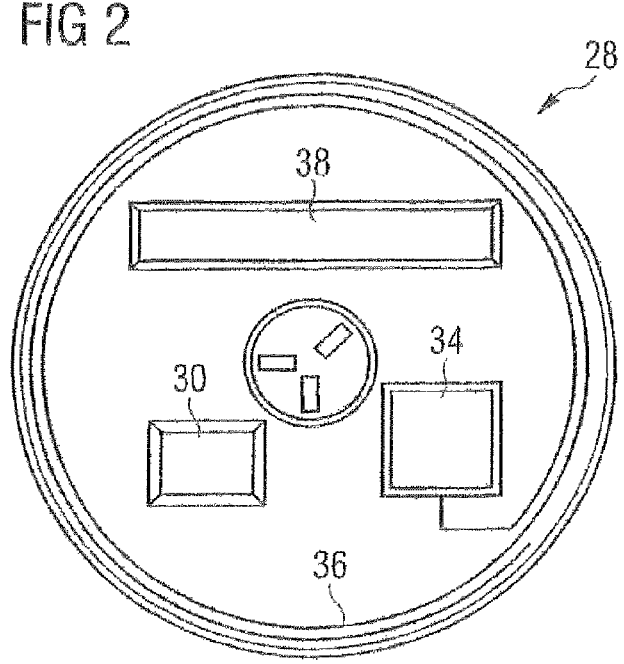

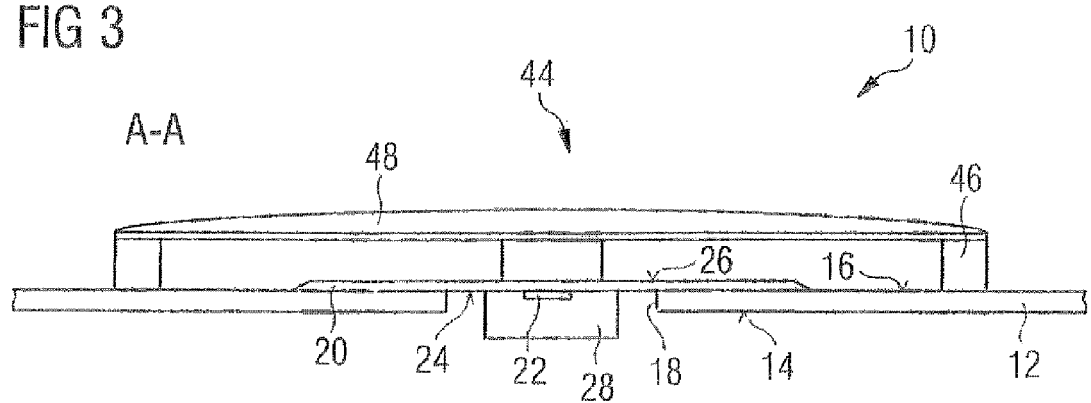
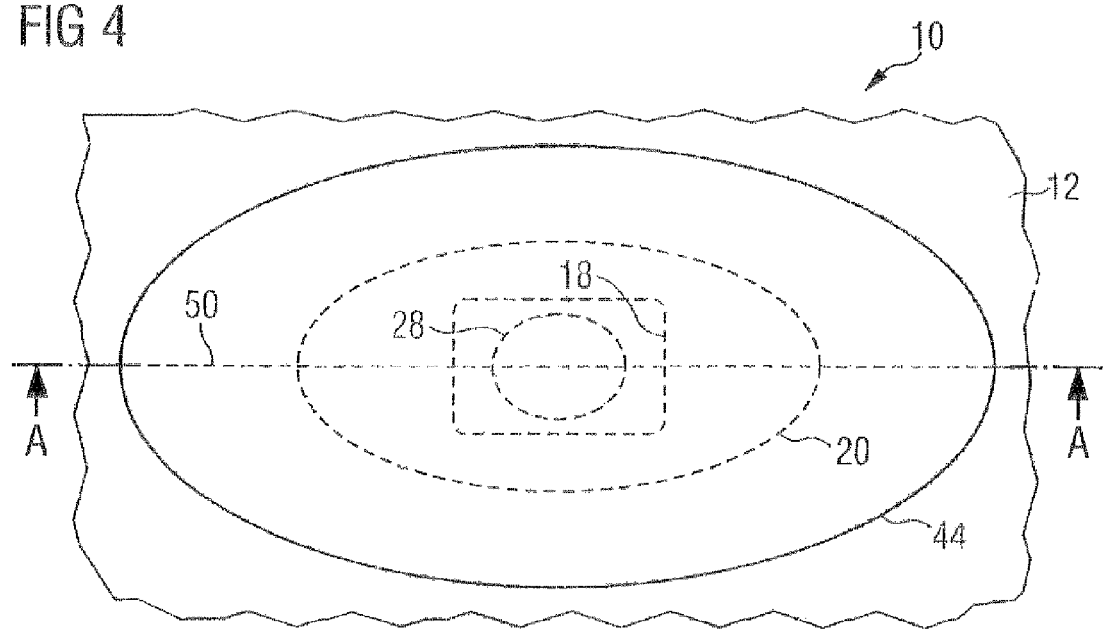

SYSTEM AND METHOD FOR REPAIRING A STRUCTURAL COMPONENT

CROSS REFERENCE TO RELATED APPLICATION

This application is entitled to and claims the benefit of German Application No. DE 10 2011 122 059.7 and U.S. Provisional Application No. 61/579,254, both filed Dec. 22, 2011, the disclosures of which, including the specification, drawings and abstract, are incorporated herein by reference in its entirety.

FIELD

The invention relates to a system and a method for repairing a structural component, in particular an aircraft structural component.

BACKGROUND

At present, damage in the region of the outer skin of aircraft is repaired by removing the damaged outer skin region and riveting on a repair patch. The repair patch is riveted to the outer skin region adjacent to the damaged outer skin region in such a manner that an opening in the aircraft outer skin resulting from removing the damaged outer skin region is covered. A riveting method of this kind is described, for example, in DE 10 2006 057 255 B4. Recently, efforts have been made to use adhesive bonding methods in aircraft construction when repairing damage to the aircraft outer skin, i.e. after removing the damaged outer skin region a repair patch is to be adhesively bonded onto a region of the aircraft outer skin adjacent to the damaged outer skin region in such a manner that an opening resulting from removing the damaged outer skin region is covered.

SUMMARY

The invention is directed at the object of providing a system and a method for repairing a structural component, in particular an aircraft structural component, which enable simple and reliable monitoring and/or checking of the quality of the repair.

This object is achieved by a system having the features of the attached system claims and a method having the features of the attached method claims.

A system according to the invention for repairing a structural component comprises a repair patch which is connected to the structural component in such a manner that it covers an opening in the structural component resulting from removing a damaged region of the structural component. A structural component is understood here to mean a load-bearing component, i.e. a component which is subjected to mechanical loads during operation. The structural component is preferably an aircraft structural component, in particular a component constituting a section of the aircraft outer skin. The structural component and the repair patch may, in principle, be made of any desired suitable material, but preference is given to metals, in particular aluminium or aluminium alloys, and also fibre-reinforced plastic materials, in particular carbon fibre-reinforced plastic materials. According to requirements, the structural component and the repair patch may also be made of the same material or of different materials. In principle, the repair patch may be connected to the structural component in any suitable manner, i.e. the repair patch may, for example, be riveted or screwed to the structural component. Preferably, however, the repair patch is adhesively bonded to the structural component, i.e. the repair patch is adhesively bonded onto a region of the structural component adjacent to the opening in the structural component in such a manner that the opening in the structural component is completely covered by the repair patch.

The repair system according to the invention further comprises a sensor which is fastened to the repair patch in a region of the repair patch covering the opening in the structural component. The sensor is adapted to detect strains and/or stresses occurring in the repair patch. On use of the structural component as a load-bearing component, stresses introduced into the structural component are also transmitted to the repair patch. The stress transmission to the repair patch is all the better, the higher the mechanical strength the connection between the structural component and the repair patch. Conversely, fewer stresses are transmitted to the repair patch if the connection between the structural component and the repair patch is less strong or even defective. Consequently, the strains and/or stresses in the repair patch which are measured by means of the sensor allow conclusions to be drawn regarding the mechanical strength the connection between the structural component and the repair patch. The sensor may be configured in the form of a stress sensor and be adapted to directly measure stresses occurring in the repair patch, Alternatively to this, however, the sensor may also be configured in the form of a strain sensor and measure material strains occurring in the repair patch, which for their part allow calculation of the stresses present in the repair patch.

The system according to the invention for repairing a structural component further comprises an evaluating device which is adapted to evaluate the strain values and/or stress values detected by the sensor. In dependence on the result of this evaluation, the evaluating device outputs a signal which is characteristic of the quality state of the connection between the structural component and the repair patch. In particular, with the aid of the strain values and/or stress values measured by means of the sensor, the evaluating device determines whether the connection between the repair patch and the structural component meets the desired quality requirements.

For example, the evaluating device may be adapted to compare the strain values and/or stress values measured by means of the sensor with corresponding predetermined threshold values. The threshold values may, for example, be strain values and/or stress values characteristic of a desired mechanical strength of the connection between the structural component and the repair patch. If the evaluating device ascertains that the strain values and/or stress values measured by the sensor lie below the corresponding strain values and/or stress values characteristic of a desired mechanical strength of the connection between the structural component and the repair patch, the evaluating device can then output a signal that indicates that the connection between the structural component and the repair patch does not have the required quality, i.e. the required strength. Furthermore, the evaluating device may be adapted to take into account strain values and/or stress values determined immediately after the structural component has been repaired, when outputting the signal which is characteristic of the quality state of the connection between the structural component and the repair patch. In particular, the evaluating device may be adapted to output a corresponding warning signal if the strain values and/or stress values determined by the sensor lie by a predetermined difference amount below the strain values and/or stress values determined immediately after the structural component has been repaired, and thereby indicate a loss of strength of the connection between the structural component and the repair patch.

The system according to the invention enables simple checking and, if necessary, also continuous monitoring of a repaired structural component. In particular, a weakening of the connection between the repair patch and the structural component can be detected very early. The system according to the invention is therefore particularly suitable for use in the repair of an aircraft structural component by means of an adhesive bonding method. At present, the approved methods for repairing aircraft outer skin components are restricted to riveting methods. However, adhesive bonding methods are easier to carry out, since it is not necessary to make a damaged aircraft outer skin section accessible from the inside, i.e. from the interior of the aircraft, in order to connect a repair patch to the damaged aircraft outer skin component. Moreover, when using an adhesive bonding method for repairing a damaged aircraft outer skin region, an increase in the structural weight due to additional rivets can be avoided. Furthermore it is possible to eliminate the need for additionally making rivet holes in the component to be repaired. It is thereby no longer necessary to keep to corresponding minimum thicknesses of aircraft outer skin components. The system according to the invention can thus help to spread the use of adhesive bonding methods when repairing aircraft structural components.

The sensor is preferably fastened to the repair patch in the region of an inner surface of the repair patch. The inner surface of the repair patch here is understood to mean a surface of the repair patch facing away from the outside environment. If the structural component is, for example, a component constituting a section on an aircraft outer skin, the inner surface of the repair patch faces the interior of the aircraft. The sensor is then protected from environmental influences.

The sensor may be integrated into a measuring module which, for example, is fastened to the repair patch in the region of an inner surface of the repair patch. The sensor integrated into the measuring module is preferably in direct contact with the surface of the repair patch, i.e. bears, for example, directly against the inner surface of the repair patch. Besides the sensor, the measuring module may further comprise a data store for storing the strain values and/or stress values detected by the sensor. The data store may also be designed to store a threshold value for the strain values and/or stress values in the repair patch. Furthermore, in the measuring module there may be provided an accumulator which supplies the sensor and/or further components of the measuring module with electrical energy. Finally, a transmitter for wireless transmission of signals may be integrated into the measuring module. The transmitter may, for example, comprise a processor and/or signal conditioner and also an antenna. A transmitter for wireless signal transmission enables cabling of the measuring module to be dispensed with.

The evaluating device for evaluating the strain values and/or stress values detected by the sensor and for outputting a signal which is characteristic of the quality state of the connection between the structural component and the repair patch may be integrated into the measuring module. The transmitter is then preferably adapted to transmit the signal, outputted by the evaluating device and characteristic of the quality state of the connection between the structural component and the repair patch, to a receiving device. The receiving device may, for example, be configured in the form of a mobile hand-held device. For monitoring or checking the repaired structural component, the receiving device can then be brought into the transmitting range of the transmitter, in order to receive the signal transmitted by the transmitter in a convenient and time-saving manner. An assessment of the quality state of the connection between the structural component and the repair patch is then possible immediately.

Alternatively to this, the evaluating device may also be integrated into a receiving device which, in turn, as described above, may be configured in the form of a mobile hand-held device. The transmitter is then preferably adapted to transmit the strain value and/or stress value, detected by the sensor and/or stored in the data store, to the receiving device. The evaluating device integrated into the receiving device then evaluates the signals transmitted by the transmitter to the receiving device and in turn immediately and conveniently delivers a signal which is characteristic of the quality state of the connection between the structural component and the repair patch.

The system according to the invention may comprise further components which enable the system to be used for immediate checking of the quality of the repair of the structural component, i.e. the quality of the connection between the structural component and the repair patch. For this purpose, the system preferably comprises a bridge element which is temporarily connectable to the structural component in such a manner that it spans a section of the structural component comprising the repair patch. The bridge element may, for example, comprise a base and a carrier supported by the base. The base is able to keep the carrier at a desired distance from the surface of the repair patch or of the structural component.

The shape of the carrier is preferably adapted to the shape of the section of the structural component repaired by means of the repair patch. If the structural component is a component constituting an aircraft outer skin section, the shape of the carrier of the bridge element is consequently preferably adapted to the curvature of the structural component constituting the aircraft outer skin section. For this purpose, the carrier may either be formed in a correspondingly curved manner or be provided with a joint which enables adaptation of the shape of the carrier to the shape of the structural component. A carrier provided with a joint is usable particularly flexibly in cooperation with differently shaped structural components. Preferably, the bridge element is provided to be temporarily connected to an outer surface of the structural component, an outer surface being understood here to mean a surface of the structural component facing the outside environment.

The system may further comprise a sealing system which is adapted to seal a space, defined by the bridge element and the section of the structural component spanned by the bridge element, against the outside atmosphere. Furthermore, the system may comprise a negative pressure-generating device which is adapted to generate, in the space sealed against the outside atmosphere by the sealing system, a pressure which is reduced relative to the ambient pressure. The negative pressure-generating device may, for example, be configured in the form of a vacuum pump and/or be provided with a pressure measuring device, for example, configured in the form of a manometer.

When a pressure, which is reduced relative to the ambient pressure, is generated with the aid of the negative pressure-generating device in the space sealed against the outside atmosphere by the sealing system, this reduced pressure also acts on an outer surface, i.e. a surface of the repair patch lying opposite the inner surface, of the repair patch. The outer surface of the repair patch faces the carrier of the bridge element in the state of the structural component when connected to the bridge element and faces the outside environment in the state of the structural component when not connected to the bridge element. The ambient pressure is in this case taken up by the bridge element and thereby decoupled from the inner surface of the repair patch. By contrast, the ambient pressure continues to act on the inner surface of the repair patch, on which the sensor for detecting the strains and/or stresses occurring in the repair patch is mounted. Consequently, the repair patch and in particular the connection between the repair patch and the structural component is loaded with the difference between the ambient pressure and the reduced pressure generated by the negative pressure-generating device.

Preferably, the negative pressure-generating device generates, in the space sealed against the outside atmosphere by the sealing system, such a reduced pressure that the differential pressure acting on the repair patch and hence the connection between the repair patch and the structural component is approximately 640 mbar. This corresponds roughly to the differential pressure acting, when an aircraft is flying at cruising altitude, on a repair patch which has been used to repair an aircraft outer skin component. The stresses and/or strains occurring in the repair patch can now be detected by the sensor and evaluated by the evaluating device. Moreover, a problem with the build-up of a negative pressure in the space sealed against the outside atmosphere by the sealing system indicates an untight and consequently defective connection between the repair patch and the structural component. This enables simple and reliable checking of the repaired structural component, i.e. in particular of the connection between the repair patch and the structural component under real mechanical loads.

The sealing system may comprise a vacuum film covering the bridge element and connected to the structural component, and a sealing element for sealing the vacuum film against the structural component. A sealing system of this kind is comparatively easy to handle and can be removed from the structural component again comparatively easily after the connection between the repair patch and the structural component has been checked.

A method according to the invention for repairing a structural component, in particular an aircraft structural component, comprises connecting a repair patch to the structural component in such a manner that the repair patch covers an opening in the structural component resulting from removing a damaged region of the structural component. A sensor is fastened to a region of the repair patch covering the opening in the structural component and is adapted to detect strains and/or stresses occurring in the repair patch. The strain values and/or stress values detected by the sensor are evaluated by means of an evaluating device. Finally, a signal which is characteristic of the quality state of the connection between the structural component and the repair patch is outputted in dependence on the result of this evaluation by the evaluating device.

The sensor is preferably fastened to the repair patch in the region of an inner surface of the repair patch.

The method may further comprise storing the strain values and/or stress values detected by the sensor in a data store, it being possible for the data store to be integrated into a measuring module also comprising the sensor. Furthermore, provision may be made for wirelessly transmitting signals by means of a transmitter which may be integrated into a measuring module also comprising the sensor.

The strain values and/or stress values detected by the sensor may be evaluated by means of an evaluating device integrated into the measuring module. The transmitter may then transmit the signal, outputted by the evaluating device and characteristic of the quality state of the connection between the structural component and the repair patch, to a receiving device.

Alternatively to this, the strain values and/or stress values detected by the sensor may be evaluated by means of an evaluating device integrated into a receiving device. The transmitter may then transmit the strain values and/or stress values, detected by the sensor and/or stored in the data store, to the receiving device.

The method according to the invention for repairing a structural component may further comprise checking the repair quality, i.e. in particular checking the quality of the connection between the repair patch and the structural component. For this purpose, a bridge element may be temporarily connected to the structural component in such a manner that the bridge element spans a section of the structural component comprising the repair patch. Subsequently, a space, defined by the bridge element and the section of the structural component spanned by the bridge element, may be sealed against the outside atmosphere. Finally, in the space sealed against the outside atmosphere by the sealing system, a pressure which is reduced relative to the ambient pressure may be generated.

The space defined by the bridge element and the section of the structural component spanned by the bridge element is preferably sealed against the outside atmosphere by means of a sealing system which comprises a vacuum film covering the bridge element and connected to the structural component, and a sealing element for sealing the vacuum film against the structural component.

An above-described system and/or an above-described method for repairing a structural component is/are usable particularly advantageously for repairing an aircraft structural component, in particular an aircraft structural component constituting a section of an aircraft outer skin.

BRIEF DESCRIPTION OF THE DRAWINGS

Preferred embodiments of the invention will now be explained in more detail with reference to the appended schematic drawings, of which FIG. 1 shows a system for repairing a structural component, FIG. 2 shows a detail illustration of a measuring module employed in the system according to FIG. 1, FIG. 3 shows a sectional view of a system for repairing a structural component, in which a bridge element is temporarily connected to the structural component, FIG. 4 shows a plan view of the system according to FIG. 3.

DETAILED DESCRIPTION OF EMBODIMENTS

Figure 5:
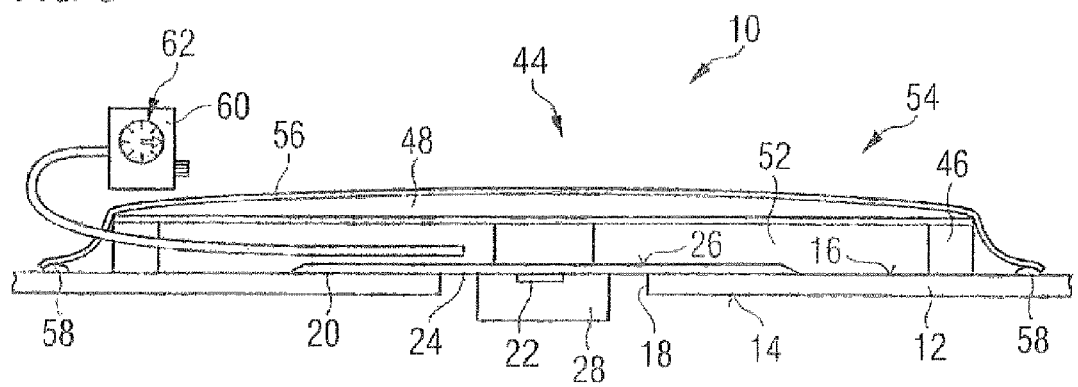
FIG. 5 shows the system according to FIG. 3, in which a space, defined by the bridge element and the section of the structural component spanned by the bridge element, is sealed against the outside atmosphere and connected to a negative pressure-generating device.

In FIG. 1, a system 10 for repairing a structural component 12 is illustrated. In the embodiment shown, the structural component 12 is configured in the form of a component constituting a section of an aircraft outer skin and has an inner surface 14 facing an interior of the aircraft and an outer surface 16 facing the outside environment. Formed in the structural component 12 is an opening 18 which has resulted from removing a damage region of the structural component 12. The structural component 12 is made of metal, in particular of aluminium or an aluminium alloy, or from a fibre-reinforced plastic material, in particular a carbon fibre-reinforced plastic material.

The opening 18 produced in the structural component 12 by removing the damaged region of the structural component 12 is covered by a repair patch 20. The repair patch 20, which is made of the same material as the structural component 12, is adhesively bonded in the region of its edge to a region of the structural component 12 adjacent to the opening 18. In particular, the repair patch 20 is adhesively bonded to the outer surface 16 of the structural component 12.

During the operation of an aircraft in which the structural component 12 is installed, mechanical loads act on the structural component 12. In particular, when the aircraft in flight, a differential pressure acts on the structural component 12, since the interior of the aircraft is kept under an increased pressure relative to the ambient pressure. The mechanical loads acting on the structural component 12 are also transmitted to the repair patch 20. The load transmission here functions all the better, the higher the mechanical strength of the connection between the structural component 12 and the repair patch 20. In other words, material elongations and stresses which occur in the repair patch 20 during the operation of the aircraft are all the greater, and ideally correspond to the material strains and stresses occurring in the structural component 12, the higher the strength of the adhesive bond between the structural component 12 and the repair patch 20.

The system 10 further comprises a sensor 22 which is fastened to the repair patch 20 in such a manner that it bears against an inner surface 24 of the repair patch 20. As with the inner surface 14 of the structural component 12, the inner surface 24 of the repair patch 20 faces the interior of the aircraft, whereas an outer surface 26 of the repair patch 20, as with the outer surface 16 of the structural component 12, faces the outside environment. The sensor 22 is configured in the form of a strain sensor, i.e. it is capable of measuring material strains occurring in the repair patch 20. From the material strains occurring in the repair patch 20, it is possible to calculate the stresses which are transmitted by the structural component 12 to the repair patch 20.

As can best be seen in FIG. 2, the sensor 22 is integrated into a measuring module 28 which is fastened in a region of the repair patch 20 covering the opening 18 in the structural component 12, so that the sensor 22 bears against the inner surface 24 of the region of the repair patch 20 covering the opening 18 in the structural component 12. Besides the sensor 22, the measuring module 28 comprises a data store 30 for storing the strain values detected by the sensor 22. Furthermore, a transmitter 32 for wireless transmission of signal is present, which transmitter comprises a processor and/or signal conditioner 34 and also an antenna 36. The components of the measuring module 28 are supplied with electrical energy by an accumulator 38.

The system 10 further comprises a receiving device 40 configured in the form of a mobile hand-held device (see FIG. 1) which serves to receive the signals transmitted by the transmitter 32. Into the receiving device 40 is integrated an evaluating device 42 which is adapted to evaluate strain values detected by the sensor 22. For this purpose, the evaluating device 42 processes the strain values which are detected by the sensor 22 and transmitted to the receiving device 40 by the transmitter 32. The strain values detected by the sensor 22 may be strain values detected directly by the sensor 22, but also strain values stored in the data store 30.

The evaluating device 42 compares the measured strain values with a stored threshold value. The threshold value may, for example, be a strain value which is characteristic of a desired mechanical strength of the connection between the structural component 12 and the repair patch 20. If the measured strain value falls short of the threshold value, the evaluating device 42 evaluates this as an indication of insufficient transmission of mechanical stresses by the structural component 12 to the repair patch 20, which is caused by a lack of strength of the connection between the structural component 12 and the repair patch 20. In other words, strain values lying below the threshold value are judged to be an indication of an (imminent) detachment of the repair patch 20 from the outer surface 16 of the structural component 12. Consequently, the evaluating device 42 outputs a signal which is characteristic of the quality state of the connection between the structural component 12 and the repair patch 20.

The evaluating device 42 may also be integrated into the measuring module 28. The transmitter 32 then transmits merely the signal, outputted by the evaluating device 42 and characteristic of the quality state of the connection between the structural component 12 and the repair patch 20, to the mobile receiving device 40. In any case, it is sufficient to bring the mobile receiving device 40 into the transmitting range of the transmitter 32. This can be done from outside the aircraft, i.e. the receiving device 40 can be brought closer to the outer surface 16 of the structural component 12 or the outer surface 26 of the repair patch 20 until it comes into the transmitting range of the transmitter 32. This may be done, for example, after each flight of the aircraft.

FIGS. 3 to 7 illustrate how the system 10 can be extended in order to be able to carry out a quality control of the connection between the structural component 12 and the repair patch 20 by means of the system 10. For this purpose, the system 10 is extended by a bridge element 44 which is temporarily connected to the structural component 12. The bridge element 44 comprises a base 46 and a carrier 48 supported by the base 46. In the arrangement illustrated in FIGS. 3 to 7, the carrier 48 of the bridge element 44 has an oval contour, as does the repair patch 20. The bridge element 44 is connected to the outer surface 16 of the structural component 12 in such a manner that it spans a section of the structural component 12 comprising the repair patch 20, the base 46 keeping the carrier 48 at a defined distance from the outer surface 16 of the structural component 12 and the outer surface 26 of the repair patch 20. The shape of the carrier 48 of the bridge element 44 is adapted to the shape of the structural component 12. For this purpose, the carrier 48 is provided with a joint 50 which enables the shape of the carrier 48 to be adapted to the curved shape of the structural component 12.

Figure 6:
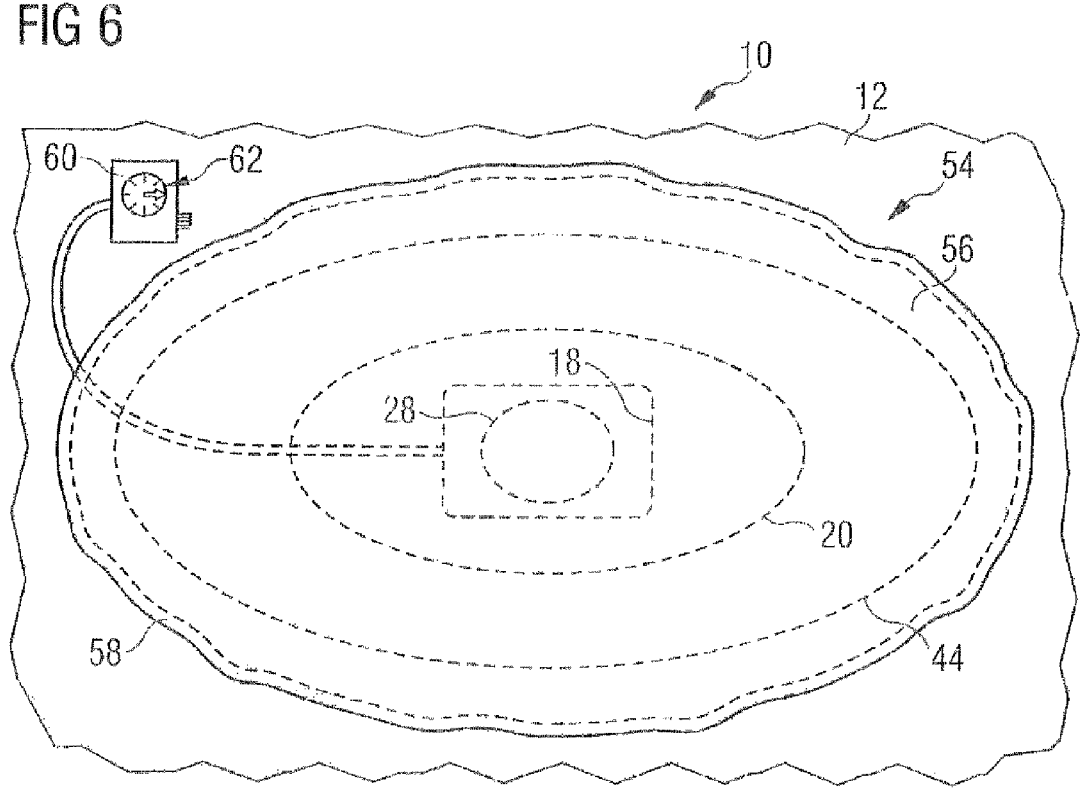
FIG. 6 shows a plan view of the system according to FIG. 5.

When the bridge element 44, as shown in FIGS. 3 and 4, is connected to the structural component 12, a space 52, defined by the bridge element 44 and the section of the structural component 12 spanned by the bridge element 44, is sealed against the outside atmosphere, see FIGS. 5 and 6. For this purpose, a sealing system 54 comprising a vacuum film 56 covering the bridge element 44 is used. The vacuum film 56 is sealed against the outer surface 16 of the structural component 12 by means of a sealing element 58. Finally, the space 52 sealed against the outside atmosphere is connected to a negative pressure-generating device 60. In the embodiment shown in the figures, the negative pressure-generating device 60 is configured in the form of a vacuum pump equipped with a manometer 62.

Figure 7:
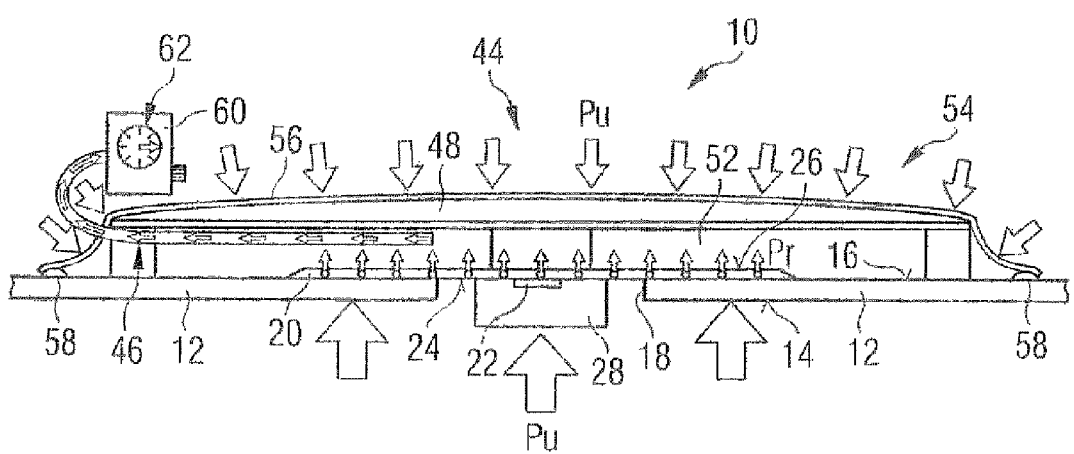
FIG. 7 shows the system according to FIG. 5 when the negative pressure-generating device generates, in the space sealed against the outside atmosphere, a pressure which is reduced relative to the ambient pressure.

As illustrated in FIG. 7, a pressure $P_r$ which is reduced relative to the ambient pressure $P_u$ is now generated in the space 52 sealed against the outside atmosphere by means of the negative pressure-generating device 60. The ambient pressure $P_u$ then acts on the inner surface 24 of the repair patch 20, whereas the reduced pressure $P_r$ in the space 52 sealed against the outside atmosphere acts on the outer surface 26 of the repair patch 20 facing the bridge element 44, since the ambient pressure $P_u$, which would otherwise act on the outer surface 26 of the repair patch 20 is taken up by the bridge element 44. Consequently, the connection between the repair patch 20 and the structural component 12 is loaded with the differential pressure between the ambient pressure $P_u$ and the reduced pressure $P_r$ in the space 52 sealed against the outside atmosphere.

In order to simulate mechanical loads which act, when the aircraft is flying at cruising altitude, on the repair patch 20, i.e. the connection between the repair patch 20 and the structural component 12, the negative pressure-generating device 60 generates, in the space 52 sealed against the outside atmosphere, such a pressure $P_r$ which is reduced relative to the ambient pressure $P_u$ that a differential pressure of approx. 640 mbar acts on the repair patch 20. If problems already occur in the space 52 sealed against the ambient atmosphere when the pressure $P_r$ which is reduced relative to the ambient pressure $P_u$ is generated, this means that the connection between the repair patch 20 and the structural component 12 is not tight and consequently has a lack of strength. If the generation of the desired negative pressure $P_r$ in the space 52 sealed against the outside atmosphere is unproblematical, the material strains in the repair patch 20 measured by the strain sensor 22 are used to assess the quality of the connection between the repair patch 20 and the structural component 12.

After completion of the quality check, the space 52 can be put under ambient pressure $P_u$ again. Furthermore, the sealing system 54 and the bridge element 44 can be removed from the structural component 12 again.

The invention claimed is:

1. System for repair of a structural component, in particular an aircraft structural component, having:
   a repair patch which is connected to the structural component in such a manner that it covers an opening in the structural component resulting from removing a damaged region of the structural component,
   a sensor which is fastened to the repair patch in a region of the repair patch covering the opening in the structural component and is configured to detect at least one of strains and stresses occurring in the repair patch,
   a bridge element which is temporarily connectable to the structural component in such a manner that it spans a section of the structural component comprising the repair patch,
   a sealing system which is configured to seal a space, defined by the bridge element and the section of the structural component spanned by the bridge element, against the outside atmosphere,
   a negative pressure-generating device configured to generate, in the space sealed against the outside atmosphere by the sealing system, a pressure which is reduced relative to the ambient pressure, and
   an evaluating device which is configured to evaluate at least one of the strain values and the stress values detected by the sensor and, in dependence on the result of this evaluation, output a signal which is characteristic of the quality state of the connection between the structural component and the repair patch to enable immediate checking of a quality of the repair patch,
   wherein the bridge element comprises a base and a carrier supported by the base, the base keeping the carrier at a distance from a surface of the repair patch and the structural component to define said space sealed by the sealing system, and
   wherein the negative pressure-generating device generates in the sealed space a reduced pressure acting on the repair patch, the reduced pressure corresponding to a differential pressure acting on the repair patch when the aircraft is flying at cruising altitude.

2. System according to claim 1,
   wherein the sensor is fastened to the repair patch in the region of an inner surface of the repair patch.

3. System according to claim 1,
   wherein the sensor is integrated into a measuring module, which further comprises at least one of:
   a data store for storing the at least one of the strain values and the stress values detected by the sensor and
   a transmitter for wireless transmission of signals.

4. System according to claim 3,
   wherein the evaluating device is integrated into the measuring module and the transmitter is configured to transmit the signal, outputted by the evaluating device and characteristic of the quality state of the connection between the structural component and the repair patch, to a receiving device.

5. System according to claim 3,
   wherein the evaluating device is integrated into a receiving device and the transmitter is configured to transmit the at least one of the strain values and the stress values, detected by the sensor, to the receiving device.

6. System according to claim 3,
   wherein the evaluating device is integrated into a receiving device and the transmitter is configured to transmit at least one of the strain values and the stress values stored in the data store, to the receiving device.

7. System according to claim 1,
   wherein the sealing system comprises a vacuum film covering the bridge element and connected to the structural component, and a sealing element for sealing the vacuum film against the structural component.

8. Method for repair of a structural component, in particular an aircraft structural component, having the steps:
   connecting a repair patch to the structural component in such a manner that the repair patch covers an opening in the structural component resulting from removing a damaged region of the structural component,
   fastening a sensor, which is configured to detect at least one of strains and stresses occurring in the repair patch, to a region of the repair patch covering the opening in the structural component,
   temporarily connecting a bridge element to the structural component in such a manner that the bridge element spans a section of the structural component comprising the repair patch,
   sealing a space, defined by the bridge element and the section of the structural component spanned by the bridge element, against the outside atmosphere, generating, in the space sealed against the outside atmosphere by the sealing system, a pressure which is reduced relative to the ambient pressure, evaluating at least one of the strain values and the stress values detected by the sensor by comparing the at least one of strains and stresses detected by the sensor with a threshold value which is characteristic of a desired quality state of the connection between the structural component and the repair patch to enable immediate checking of a quality of the repair patch, and outputting a signal which is characteristic of the quality state of the connection between the structural component and the repair patch, in dependence on the result of said comparing operation, wherein the bridge element comprises a base and a carrier supported by the base and connecting the bridge element, so that the base keeps the carrier at a distance from a surface of the repair patch and the structural component to define said space sealed by said sealing, and wherein generating the pressure comprises generating in the sealed space a reduced pressure acting on the repair patch, so that the reduced pressure corresponds to a differential pressure acting on the repair patch when the aircraft is flying at cruising altitude.

9. Method according to claim 8,
wherein the sensor is fastened to the repair patch in the region of an inner surface of the repair patch.

10. Method according to claim 8,
wherein the method further comprises at least one of:
storing the at least one of the strain values and the stress values detected by the sensor in a data store which is integrated into a measuring module also comprising the sensor, and
wirelessly transmitting signals by means of a transmitter which is integrated into a measuring module also comprising the sensor.

11. Method according to claim 10,
wherein the at least one of the strain values and the stress values detected by the sensor are evaluated by means of an evaluating device integrated into the measuring module, and the transmitter transmits the signal, outputted by the evaluating device and characteristic of the quality state of the connection between the structural component and the repair patch, to a receiving device.

12. Method according to claim 10,
wherein the at least one of the strain values and the stress values detected by the sensor are evaluated by means of an evaluating device integrated into a receiving device, and the transmitter transmits the at least one of the strain values and the stress values, detected by the sensor, to the receiving device.

13. Method according to claim 10,
wherein the at least one of the strain values and the stress values detected by the sensor are evaluated by an evaluating device integrated in to a receiving device, and the transmitter transmits the at least one of the strain values and the stress values stored in the data store, to the receiving device.

14. Method according to claim 8,
wherein the space defined by the bridge element and the section of the structural component spanned by the bridge element is sealed against the outside atmosphere by means of a sealing system which comprises a vacuum film covering the bridge element and connected to the structural component, and a sealing element for sealing the vacuum film against the structural component.

15. A method of use of a system according to claim 1 comprising outputting a warning signal when the signal indicates that the quality state represents the at least one of the strain values and the stress values lie by a predetermined difference amount below at least one of strain values and stress values determined immediately after the structural component has been repaired, thereby indicating a loss of strength of the connection between the structural component and the repair patch.

16. The method of claim 8 further comprising outputting a warning signal when the signal indicates that the quality state represents the at least one of the strain values and the stress values lie by a predetermined difference amount below at least one of strain values and stress values determined immediately after the structural component has been repaired, thereby indicating a loss of strength of the connection between the structural component and the repair patch.

17. System according to claim 1, wherein the evaluating device is structured to compare the at least one of strains and stresses detected by the sensor with a threshold value which is characteristic of a desired quality state of the connection between the structural component and the repair patch, and, in dependence on the result of this evaluation comparison, output a signal which is characteristic of the quality state of the connection between the structural component and the repair patch.

18. System according to claim 1, wherein the sensor is integrated into a measuring module which is fastened in a region of the repair patch covering the opening in the structural component, so that the sensor bears against an inner surface of a region of the repair patch covering the opening in the structural component.

19. Method according to claim 8, wherein the evaluating operation comprises comparing the at least one of strains and stresses detected by the sensor with a threshold value which is characteristic of a desired quality state of the connection between the structural component and the repair patch, and outputting a signal which is characteristic of the quality state of the connection between the structural component and the repair patch, in dependence on the result of said comparing operation.

20. System according to claim 1, wherein the sensor is in direct contact with a surface of the repair patch.

21. System according to claim 1, wherein the repair patch is adhesively bonded to an outer surface of the structural component.

22. Method according to claim 8, wherein fastening the sensor comprises fastening the sensor in direct contact with a surface of the repair patch.

23. Method according to claim 8, wherein connecting the repair patch comprises adhesively bonding the repair patch to an outer surface of the structural component.

* * * * *

UNITED STATES PATENT AND TRADEMARK OFFICE
CERTIFICATE OF CORRECTION

PATENT NO. : 9,457,553 B2  
APPLICATION NO. : 13/721935  
DATED : October 4, 2016  
INVENTOR(S) : Heiner Stehmeier et al.

Page 1 of 1

It is certified that error appears in the above-identified patent and that said Letters Patent is hereby corrected as shown below:

On the Title Page

Item (72), Inventors, Line 1 incorrectly reads:
"Heiner Stehmeiner, Hamburg (DE)"

And should read:
"Heiner Stehmeier, Hamburg (DE)"

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*